(12) United States Patent
Wang et al.

(10) Patent No.: US 6,521,346 B1
(45) Date of Patent: Feb. 18, 2003

(54) ANTISTATIC/ANTIREFLECTIVE COATING FOR VIDEO DISPLAY SCREEN WITH IMPROVED REFRACTIVITY

(75) Inventors: Kuo-Chu Wang, Taipei (TW); Chun-Min Hu, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 09/965,309

(22) Filed: Sep. 27, 2001

(51) Int. Cl.[7] .................... B32B 17/06; H01J 29/10
(52) U.S. Cl. .................... 428/432; 313/473; 313/479
(58) Field of Search .................... 428/432; 313/479, 313/478, 467, 473; 348/834

(56) References Cited

U.S. PATENT DOCUMENTS

| | | | |
|---|---|---|---|
| 2,522,531 A | 9/1950 | Mochel | 117/54 |
| 2,564,677 A | 8/1951 | Davis | 201/73 |
| 2,564,707 A | 8/1951 | Mochel | 117/54 |
| 2,564,709 A | 8/1951 | Mochel | 201/73 |
| 2,564,710 A | 8/1951 | Mochel | 201/73 |
| 2,612,611 A | 9/1952 | Szegho et al. | 250/80 |
| 2,680,205 A | 6/1954 | Burton | 313/92 |
| 2,734,142 A | 2/1956 | Barnes | 313/92 |
| 2,808,351 A | 10/1957 | Colbert et al. | 117/211 |
| 2,833,902 A | 5/1958 | Gaiser et al. | 201/73 |
| 2,852,415 A | 9/1958 | Colbert et al. | 117/211 |
| 2,919,212 A | 12/1959 | Gaiser | 117/215 |
| 2,977,412 A | 3/1961 | Rhodes et al. | 178/7.85 |
| 3,093,598 A | 6/1963 | McMillan et al. | 252/521 |
| 3,252,829 A | 5/1966 | Romstadt et al. | 117/211 |
| 3,689,312 A | 9/1972 | Long, III et al. | 117/94 |
| 3,738,732 A | 6/1973 | Ikenda | 117/33.3 |
| 4,263,335 A | 4/1981 | Wagner et al. | 427/29 |
| 4,393,095 A | 7/1983 | Greenberg | 427/87 |
| 4,463,114 A | 7/1984 | Balchunis et al. | 524/157 |
| 4,468,702 A | 8/1984 | Jandrell | 358/245 |
| 4,490,227 A | 12/1984 | Bitter | 204/192 |
| 4,563,612 A | 1/1986 | Deal et al. | 313/478 |
| 4,649,126 A | 3/1987 | Gaprindashvili et al. | 501/43 |
| 4,650,557 A | 3/1987 | Bitter | 204/192.12 |
| 4,695,045 A | 9/1987 | Chase et al. | 269/152 |
| 4,785,217 A | 11/1988 | Matsuda et al. | 313/479 |
| 4,857,361 A | 8/1989 | Bloss et al. | 427/109 |
| 4,884,006 A | 11/1989 | Prazak, III | 313/474 |
| 4,885,501 A | 12/1989 | Tong | 313/402 |
| 4,930,015 A | 5/1990 | Dougherty et al. | 358/246 |
| 4,945,282 A | 7/1990 | Kawamura et al. | 313/479 |

(List continued on next page.)

FOREIGN PATENT DOCUMENTS

| | | |
|---|---|---|
| EP | 0 585 819 A1 | 8/1993 |
| JP | 3-167739 | 7/1991 |
| JP | 5-36365 9 | 2/1993 |

*Primary Examiner*—Deborah Jones
*Assistant Examiner*—G. A. Blackwell-Rudasill
(74) *Attorney, Agent, or Firm*—Emrich & Dithmar

(57) ABSTRACT

A two-layer coating for the outer surface of a glass display screen of a video display device such as a cathode ray tube (CRT) includes an inner antistatic layer and an outer antireflective layer. The outer antireflective layer contains silica and has a refractive index in the range of 1.4–1.5. The inner layer contains carbon black powder particles which provide high electrical conductivity to dissipate electrostatic charge on the glass display screen. The inner layer further includes a surface activation agent, such as glycol, for dispersing the carbon black particles in the antistatic solution. To increase the refractive index of the inner layer to a value greater than its typical value, which is in the range of 1.5–2.0, for the purpose of reducing light reflection from the glass display screen while maintaining high conductivity, $ZrO_2$, ZnO, ZnS or $TiO_2$, or a combination thereof, is added to the inner antistatic layer to provide a stable solution with optically and electrically desirable characteristics.

6 Claims, 1 Drawing Sheet

U.S. PATENT DOCUMENTS

| | | | |
|---|---|---|---|
| 4,958,148 A | 9/1990 | Olson | 340/712 |
| 4,987,338 A | 1/1991 | Itom et al. | 313/478 |
| 5,011,443 A | 4/1991 | Park | 445/2 |
| 5,051,652 A | 9/1991 | Isomura et al. | 313/479 |
| 5,099,171 A | 3/1992 | Daiku et al. | 313/479 |
| 5,122,709 A | 6/1992 | Kawamura et al. | 313/479 |
| 5,150,004 A | 9/1992 | Tong et al. | 313/479 |
| 5,189,337 A | 2/1993 | Endo et al. | 313/479 |
| 5,200,667 A | 4/1993 | Iwasaki et al. | 313/478 |
| 5,204,177 A | 4/1993 | Sato et al. | 428/328 |
| 5,241,097 A | 8/1993 | Zupancic et al. | 556/460 |
| 5,254,904 A | 10/1993 | Van De Leest et al. | 313/479 |
| 5,279,851 A | 1/1994 | Minosou et al. | 427/126.2 |
| 5,291,097 A | 3/1994 | Kawamura et al. | 313/478 |
| 5,322,540 A | 6/1994 | Jacquet et al. | 65/60.2 |
| 5,370,981 A | 12/1994 | Krafft et al. | 430/529 |
| 5,372,924 A | 12/1994 | Quintens et al. | 430/527 |
| 5,376,308 A | 12/1994 | Hirai et al. | 252/518 |
| 5,378,404 A | 1/1995 | Han et al. | 252/500 |
| 5,382,383 A | 1/1995 | Hirai et al. | 252/501.1 |
| 5,387,433 A | 2/1995 | Balian et al. | 427/126.3 |
| 5,404,073 A | 4/1995 | Tong et al. | 313/479 |
| 5,412,279 A | 5/1995 | De Boer | 313/479 |
| 5,443,944 A | 8/1995 | Krafft et al. | 430/529 |
| 5,489,369 A | 2/1996 | Bjornard et al. | 204/298.25 |
| 5,492,762 A | 2/1996 | Hirai et al. | 428/447 |
| 5,582,859 A * | 12/1996 | Tong et al. | 427/126.3 |

* cited by examiner

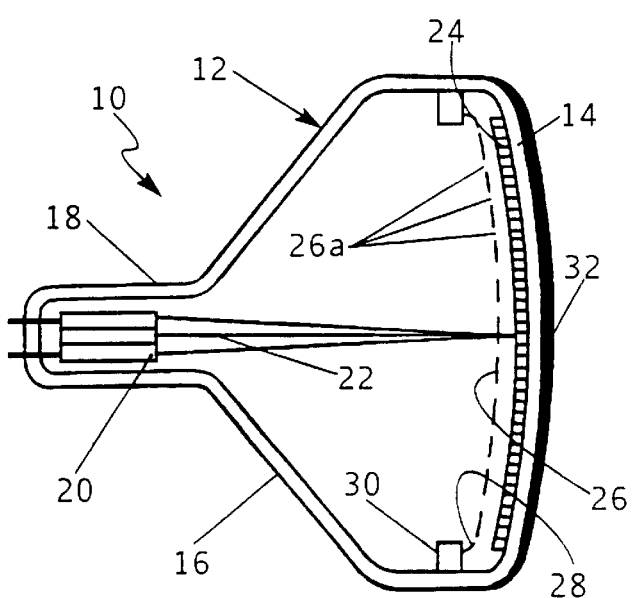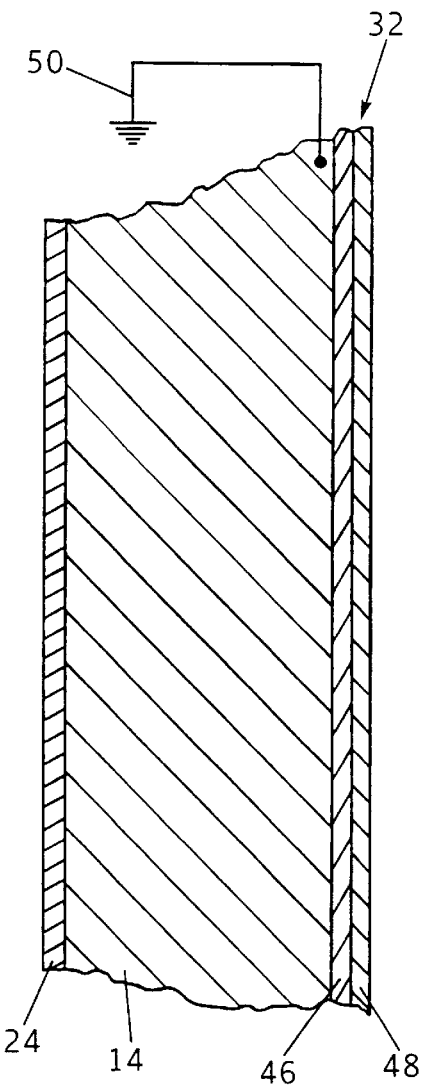
FIG. 1
FIG. 2

ANTISTATIC/ANTIREFLECTIVE COATING FOR VIDEO DISPLAY SCREEN WITH IMPROVED REFRACTIVITY

FIELD OF THE INVENTION

This invention relates generally to self-emitting color display devices such as cathode ray tubes (CRTs) and is particularly directed to a two-layer coating for the outer surface of the display screen of a self-emitting color display device including an inner antistatic layer and an outer antireflective layer having improved optical characteristics.

BACKGROUND OF THE INVENTION

Self-emitting display devices, such as of the CRT-type, produce a video image by bombardment of phosphor elements disposed on the inner surface of the device's display screen by high energy electrons. In a color display device, the phosphor elements are separated into three groups, with each group emitting one of the primary colors of red, green or blue when impinged upon by the energetic electrons.

Typically disposed on the outer surface of the device's display screen is a two-layer coating in the form of an inner antistatic layer and an outer antireflective layer, with the latter typically containing silica. The inner antistatic layer is electrically conductive for directing the accumulation of an electrostatic charge on the CRT's glass display screen to neutral ground. The build-up of electrostatic charge on the CRT's glass display screen attracts dust to the viewing surface, thus degrading a video image presented thereon. In addition, contact with the display screen by a viewer may cause a mild electric shock which is uncomfortable and may even be dangerous to the viewer. The dielectric nature of the glass display panel contributes to the possibility of the accumulation of a very high electrostatic charge thereon, particularly when the CRT is turned on or off, which charge may remain on the panel for an extended period.

The inner antistatic layer may be rendered electrically conductive by any number of components in its composition. For example, the inner antistatic layer may include a metallic compound to impart the desired antistatic characteristic, where the metallic compound includes at least one element selected from the group consisting of platinum, palladium, tin, and gold. Alternatively, a metal oxide such as tin oxide which is doped with another metal such as antimony may be included in the inner antistatic layer to provide the desired electrical conductivity. Another approach employs a hygroscopic layer such as of silane, water, sulfuric acid and an alcohol mixture for rendering the material conductive.

Another common approach is to provide the inner antistatic layer with electrically conductive carbon black particles to provide electrostatic shielding for the display device as well as grounding of the electrostatic charge. In order to provide a high level of conductivity, it is desirable to highly disperse the carbon black particles throughout the inner antistatic layer. Because the carbon black particles have a relatively high specific surface area, i.e., BET value, a large amount of surface activation agent is required to effectively disperse the carbon black particles throughout the inner antistatic layer. The addition of the surface activation agent, which is typically glycol, to the inner antistatic layer lowers the light refractive index of this solution. This lowering of the light refractive index of the inner antistatic layer relative to that of the outer antireflective layer increases the reflection of light from the display screen resulting in a degradation in the resolution and contrast of a video image presented on the display screen. Increased light reflection also causes eye fatigue in the viewer.

The light refractive index of the inner antistatic layer is typically in the range of 1.5–2.0. The outer antireflective layer containing silica typically has a light refractive index of 1.4–1.5. While it is highly desirable to raise the light refractive index of the inner antistatic layer to reduce light reflection, this is difficult to accomplish because of its lowered light refractive index caused by the addition of the aforementioned surface activation agent.

The present invention addresses the aforementioned limitations of the prior art by providing a two-layer coating for the outer surface of the glass display screen of a self-emitting video display device such as a CRT wherein light reflection from the display screen is reduced by increasing the refractive index of the inner antistatic layer relative to that of the outer antireflective layer.

OBJECTS AND SUMMARY OF THE INVENTION

Accordingly, it is an object of the present invention to provide a two-layer coating for the outer surface of the display screen: of a self-emitting color display device having high electrical conductivity and improved optical characteristics.

It is another object of the present invention to provide an inner antistatic layer in a two-layer coating deposited on the outer surface of the display screen of a CRT having a higher refractive index for reducing light reflection from the display screen.

A further object of the present invention is to provide for the adjustment of the light refractive index of a first inner antistatic layer in a two-layer coating which also includes a second outer antireflective layer applied to the outer surface of a CRT's display screen for improved video image viewing on the display screen.

A still further object of the present invention is to add one or more materials having a high light refractive index to the inner antistatic layer of a two-layer antistatic/antireflective coating on the surface of a video display screen to form a stable solution with the required light refractive index and electrical conductivity.

The present invention contemplates adding a material, or a combination of materials, with a high light refractive index to a solution which is to form the inner antistatic layer of a two-layer antistatic/antireflective coating on the surface of the screen of a video display device such as of the self-emitting type. The added material, or combination of materials, increases the light refractive index of the inner antistatic layer resulting in a reduction in the reflection of light from the display screen and improved presentation of a video image displayed thereon. The inner antistatic layer includes a conductive polymer and highly dispersed carbon black particles to provide the layer with the required electrical conductivity for directing an electrostatic charge on the display screen to neutral ground. To maintain the carbon black particles highly dispersed, a large quantity of a surface activation agent such as glycol is provided in the inner antistatic layer which reduces the light refractive index of the solution. To overcome this problem and provide the inner antistatic layer with the required light refractive index, materials having a high light refractive index such as $ZrO_2$, $ZnO$, $ZnS$, or $TiO_2$ are added, either individually or in combination, to the inner antistatic layer to increase its light refractive index while maintaining high electrical conductivity in a stable solution. Increasing the light refractive index of the inner antistatic layer relative to that of the outer antireflective layer reduces light reflection from the video display screen for improved video image resolution and contrast and reduced viewer eye fatigue.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a longitudinal sectional view of a CRT incorporating an antireflective/antistatic coating in accordance with the principles of the present invention; and FIG. 2 is a partial sectional view of a flat display screen having an outer surface coating comprised of an inner antistatic layer and an outer antireflective layer in accordance with the present invention.

DETAILED DESCRIPTION OF THE PREFERRED EMBODIMENTS

Referring to FIG. 1, there is shown a longitudinal sectional view of a color CRT 10 incorporating an antistatic/antireflective coating 32 having an inner antistatic layer with a high light refractive index in accordance with the present invention. In the following discussion the terms "display screen", "display panel" and "faceplate" are used interchangeably. In addition, the terms "layer" and "coating" are used synonymously. CRT 10 includes a sealed glass envelope 12 having a forward faceplate or display screen 14, an aft neck portion 18, and an intermediate funnel portion 16. Disposed on the inner surface of glass display screen 14 is a phosphor screen 24 which includes plural discrete phosphor deposits, or elements, which emit light when an electron beam is incident thereon to produce a video image on the display screen. Color CRT 10 includes three electron beams 22 directed onto and focused upon the CRT's glass display screen 14. Disposed in the neck portion 18 of the CRT's glass envelope 12 are plural electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having a plurality of spaced electron beam passing apertures 26a and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be attached to the inner surface of the CRT's glass envelope 12 and the shadow mask 26 may be attached to the mounting fixture by conventional means such as weldments or a glass-based frit.

Referring to FIG. 2, there is shown a partial sectional view of a portion of the CRTs glass display screen 14 having the aforementioned phosphor layer 24 on the inner surface thereof and an outer antistatic/antireflective coating 32 on the outer surface thereof in accordance with the present invention. The glass display screen 14 of FIG. 2 is shown as being flat as the present invention is applicable to both curved display screens as shown in FIG. 1 as well as to flat display screens as shown in FIG. 2. In addition, while the present invention has been illustrated in the figures in terms of use on the outer surface of the display screen of a CRT, the present invention is not limited to use with this type of display device. For example, the antistatic/antireflective coating 32 of the present invention may be used equally as well on the outer surface of the display panel of virtually any type of self-emitting color display device, i.e., where the video image is produced by phosphor activated by energetic electrons incident thereon. Self-emitting color display devices other than CRTs include field emission displays, plasma discharge panels, vacuum fluorescent screens, and gas discharge screens. The phosphor layer 24 disposed on the inner surface of the glass display screen 14 may be in the form of a large number of discrete dots or stripes.

In accordance with the present invention, the antistatic/antireflective coating 32 includes an inner antistatic layer 46 and an outer antireflective layer 48. A conductor 50 may be attached to the inner antistatic layer 46 or to the outer surface portion of the display screen 14 for electrically coupling the display screen to neutral ground potential. In this manner, the build-up of electrostatic charge on the display screen 14 is limited by discharging the electrostatic charge to neutral ground via the electrically conductive inner antistatic layer 46.

Disposed in the inner antistatic layer 46 for rendering it electrically conductive are carbon black particles. The carbon black is added in powder form to the inner antistatic layer 46 and has a relatively high BET (specific surface area) which retards its dispersion within the inner antistatic layer. In order to fully disperse the carbon black particles within the inner antistatic layer 46 so as to provide this layer with a high level of electrical conductivity for dissipating electrostatic charge build-up to neutral ground, a surface activation agent is added to the inner antistatic layer. Because of the high specific surface area of the carbon black particles, a large quantity of the surface activation agent must be added to the inner antistatic layer 46. A typical surface activation agent added for the purpose of dispersing the carbon black particles in the inner antistatic layer 46 is glycol. The addition of large quantities of this surface activation agent lowers the light refractive index of the solution. The inner antistatic layer 46 also typically includes a conductive polymer to provide a high level of electrical conductivity.

The light refractive index of the inner antistatic layer 46 is typically in the range of 1.5–2.0. The outer antireflective layer 48 typically contains silica and typically has a light refractive index in the range of 1.4–1.5. While it is highly desirable to increase the value of the light refractive index of the inner antistatic layer 46 relative to that of the outer antireflective layer 48 in order to reduce light reflection from the glass display screen 14, prior attempts to do this have met with only limited success because of the layer's composition.

In accordance with the present invention, to overcome this problem, a material, or a combination of materials, having a relatively high light refractive index is added to the inner antistatic layer 46 for forming a stable solution having a higher light refractive index than heretofore available. Materials having a relatively high light refractive index capable of forming an inner antistatic layer 46 having a higher light refractive index while maintaining high electrical conductivity in a stable solution include $ZrO_2$ (1.98), ZnO (2.02), ZnS (2.37), and $TiO_2$ (2.7), where the light refractive index of each of these materials is indicated in parenthesis. The addition of one or more of these materials having a high light refractive index increases the light refractive index of the inner antistatic layer 46 for substantially reducing light reflection from the glass display screen 14. This invention further contemplates adjusting the light refractive index of the inner antistatic layer by adding one or more of the indicated high light refractive index materials to minimize light reflected to a viewer from the glass display screen.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A multi-layer coating for the outer surface of a display screen of a self-emitting display device, wherein said display screen further includes a phosphor coating on an inner surface thereof, and wherein said phosphor coating is responsive to energetic electrons incident thereon for providing a video image, said coating comprising:

an inner antistatic layer disposed on the outer surface of the display screen and having a first refractive index $n_1$, wherein said inner antistatic layer includes electrically conductive particles having a high specific surface area and a surface activation agent to disperse said conductive particles in said inner antistatic layer;

an outer antireflective layer disposed on said inner antistatic layer and having a second refractive index $n_2$, where $n_1 \geq n_2$, and wherein said outer antireflective layer includes silica; and a high light refractive material added to said inner antistatic layer to increase the refractive index $n_1$ of said inner antistatic layer and reduce light reflection from the display screen, wherein said high light refractive material is from the group comprising $ZrO_2$, ZnO and ZnS.

2. The coating of claim 1 wherein said high light refractive material further includes $TiO_2$.

3. The coating of claim 2 wherein said surface activation agent is glycol.

4. The coating of claim 3 wherein said electrically conductive particles are comprised of carbon black.

5. The coating of claim 4 wherein $n_1$ is in the range of 1.5–2.0, $n_2$ is in the range of 1.4–1.5, and $ZrO_2$, ZnO, ZnS, and $TiO_2$ each have a respective index of refraction of 1.98, 2.02, 2.37 and 2.7.

6. The coating of claim 1 for covering the display screen of a self-emitting display device such as a field emission display, a plasma discharge panel, a vacuum flourescent screen, a gas discharge screen, or a cathode ray tube.

* * * * *